United States Patent [19]

Bollinger et al.

[11] 4,265,763
[45] May 5, 1981

[54] PERMEATOR APPARATUS

[75] Inventors: Wayne A. Bollinger, Cary; Roger G. Guay, Apex, both of N.C.

[73] Assignee: Monsanto Company, St. Louis, Mo.

[21] Appl. No.: 86,211

[22] Filed: Oct. 18, 1979

[51] Int. Cl.³ .............................................. B01D 31/00
[52] U.S. Cl. .................................. 210/323.2; 210/450; 210/433.2
[58] Field of Search .................. 210/321 R, 22, 333 R, 210/323 T, 450, 433 M; 422/48; 165/83, 82, 81, 175

[56] References Cited

U.S. PATENT DOCUMENTS

| 2,512,748 | 6/1950 | Lucke | 165/175 X |
| 3,398,787 | 8/1968 | Bevevino | 165/81 |
| 3,583,907 | 6/1971 | Borsanyi | 210/22 |
| 3,760,949 | 9/1973 | Carey et al. | 210/321 R |
| 4,002,567 | 1/1977 | Konno et al. | 210/333 R |

FOREIGN PATENT DOCUMENTS 2019329  11/1971  Fed. Rep. of Germany ....... 210/323 T Primary Examiner—Frank A. Spear, Jr.
Attorney, Agent, or Firm—Thomas E. Kelley; Norman L. Balmer; Howard C. Stanley

[57] ABSTRACT

In apparatus containing a bundle of tubes such as permeators, a tubular spacer substantially surrounds a tube sheet in which tubes are embedded for at least a portion of the lateral surface of the tube sheet. The tubular spacer serves to position the tube sheet within the apparatus. The tube sheet has at least one rise region intermediate a face and an expanded zone having larger cross-sectional dimensions than the corresponding dimensions of the face, and the rise region is adapted to abut the tubular spacer. The tube sheet can have sufficient length along the orientation of the tubes in order to ensure a fluid tight relationship between tubes and the tube sheet, and the amount of material to form the tube sheet can be reduced, thereby minimizing the effect of differential expansions.

22 Claims, 4 Drawing Figures

PERMEATOR APPARATUS

This invention pertains to apparatus such as heat exchangers and permeators which contain tubes embedded in tube sheets. A particularly attractive aspect of this invention relates to improved permeators utilizing hollow fiber membranes in which the hollow fiber membranes are embedded in a tube sheet and the lumens of the hollow fibers extend in a fluid communication relationship through the tube sheet.

An apparatus, such as heat exchangers and permeators, has tubes positioned within a tubular shell with at least one end of each of the tubes embedded in a tube sheet. One purpose of the tube sheet is to secure the tubes in an essentially fluid tight relationship within the tube sheet. The tube sheet may then be secured in an essentially fluid tight relationship in the apparatus such that fluid does not pass between the shell side and lumen side of the tube. Small leakages around the tube sheet can adversely effect the performance of a heat exchanger, and the effect on the performance of a permeator may often be even more serious since the non-permeating moieties can pass to the permeate exit side of the membranes and reduce the selectivity of separation of the membrane. Another purpose of the tube sheet is to provide a sufficiently strong barrier to fluid flow that during operating conditions, the tube sheet does not rupture or otherwise lose its integrity such that fluid can pass through the tube sheet. Therefore, in many instances the tube sheet is of substantial thickness in order to ensure achieving a fluid tight relationship with the tubes and to ensure that the tube sheet can withstand any pressure differentials to which it may be subjected during operation.

In some operations, a tube sheet may be subjected to environments which tend to expand or contract the material of the tube sheet as well as potentially the materials of the tubes and shell. These expansions or contractions may be due to temperature and/or the presence of chemical moieties in the streams being processed in the apparatus which affect any of the materials of the tube sheets, tubes or shells. Any such expansions and/or contractions can pose several difficulties, especially since dissimilar materials are essentially always used for the tubes, tube sheet, and shell. For instance, a relative change in size (hereafter a "differential in expansion") between the tube sheet and shell may pose difficulties in ensuring a fluid tight seal. If, say, a tube sheet, which is positioned within a shell, expands in the operating environment to a greater extent than the shell, unduly large forces could be generated resulting in damage to the shell or tube sheet. Also, similar differentials in expansion can occur between the tube sheet and the tube with similarly adverse effects. Moreover, since tube sheets generally have two regions, i.e., a region having a relatively high density of tubes and a surrounding region having few, if any, tubes, each region may exhibit different expansion and contraction properties thereby increasing the risk that damage could occur within the tube sheet at the interface between these regions. Furthermore, one class of materials which have been found particularly attractive in fabricating tube sheets and tubes, are resins, including synthetic and natural resins, which can be applied to the tubes or cast around the tubes as a liquid and then solidified, e.g., by curing. Such resinous materials, however, are often prone to exhibit substantial swelling in the presence of many chemical moieties which may be present in the streams being treated by the apparatus. Hence, even greater problems of diffierentials in expansion may be posed.

One type of apparatus which may be particularly affected by these problems of differentials in expansion are permeators. Permeators are utilized for separating at least one fluid from a fluid mixture containing at least one other component wherein the separation is effected by membranes. Separations effected by membranes can include gas-gas, gas-liquid, and liquid-liquid (including liquid-dissolved solids) separations. A fluid may pass through the membrane by interaction with the materials of the membrane or by flow in the interstices or pores present in the membrane. In membrane separations, a permeable fluid in the fluid mixture (feed mixture) passes, under the influence of a driving force such as concentration, partial pressure, total pressure, etc., depending on the nature of the membrane separation operation from a feed side of the membrane to a permeate exit side of the membrane. Usually, the driving force comprises maintaining a pressure differential across the membrane, and the greater the pressure differential, the greater the flux of the permeating fluid and the less membrane surface area which is required.

Membranes in a configuration of tubes, e.g., hollow fibers or hollow filaments, are particularly attractive in that the hollow fibers are generally self supporting, even at relatively high pressure differentials, and provide a greater amount of membrane surface area per unit volume of permeator than that which may be provided by, e.g., film membranes. Thus, permeators containing hollow fibers may be attractive from the standpoint of convenience, size and reduced complexity of design. However, to be commercially attractive, the permeators must be able to withstand the operating conditions to which they may be subjected during separation operations and should be relatively non-complex and easily assemblable to facilitate manufacturing.

Permeators containing hollow fiber membranes have found acceptance for use in desalination, ultrafiltration, and hemodialysis. In general, these separation operations provide environments which do not unduly swell the tube sheets. In view of the relatively mild operating environments to which these permeators have been exposed, tube sheets could be provided in a relatively non-complex manner. For instance, in hemodialysis units such as disclosed by Green, et al., in U.S. Pat. No. 4,001,110, the tube sheet is simply cast in the shell such that the resinous material of the tube sheet adheres to the hollow fiber membranes and the interior surface of the shell. Alternatively, a tube sheet having the hollow fiber membranes embedded therein can be separately prepared and then inserted within a permeator shell. For instance, Mahon in U.S. Pat. No. 3,228,877 discloses a permeator wherein the hollow fiber membranes are embedded in a cement material positioned within the bore of a coupling fitting and the cement material is in a fluid tight contact with the coupling fitting. The coupling fittings are then placed in a header end plate to assemble the permeator. One commonly encountered means for securing a tube sheet within a shell is by the use of "O" rings which are positioned around the tube sheet and contact the interior surface of the shell to provide the desired fluid tight relationship. The use of such "O" rings are disclosed, for instance, by McLain in U.S. Pat. No. 3,422,008; Caracciolo in U.S. Pat. No.

3,528,553; McNamara, et al., in U.S. Pat. No. 3,702,658; and Clarke in U.S. Pat. No. 4,061,574.

The foregoing mentioned means for securing a tube sheet within a shell appear to provide no region for absorbing differentials in expansion or depend upon close tolerancing between the tube sheet and the shell such that "O" rings or the like can provide the necessary fluid tight relationship. Unavoidable differentials in expansions, e.g., due to changes in temperature, swelling agents in fluids being processed, etc., may therefore result in substantial difficulties.

In another proposal, Carey, et al., in U.S. Pat. No. 3,760,949 disclose a tube sheet which is constructed of an elastomeric sealant and is in the form of a tapered plug with its narrowest point being proximate to the end. The elastomeric sealant is held within a mated reverse taper element which is inserted into the permeator shell. A porous plate is positioned at the end of the elastomeric sealant to constrain the sealant within the mated reverse taper element. While the elastomeric nature of the tube sheet may enable sufficient flowing of the tube sheet such that no undue problems caused by differentials in expansion exist, the elastomeric material of the tube sheet may not be able to impart the desired strength to the tube sheet and may increase difficulties in the handling of the tube sheet and the assembly of the permeator.

In view of the benefits that can be provided by fluid separations effected by membranes, it is desired to utilize permeator technology in harsher environments such as gaseous purge streams and liquid waste streams which can contain moieties which may swell the material of the tube sheet.

By this invention, apparatus containing tubes and utilizing essentially fluid impermeable tube sheets are provided wherein differentials in expansion between the tube sheet and at least one of the shell and the tube can be accommodated while maintaining the desired fluid tight relationship across the tube sheet. Moreover, the apparatus of this invention are able to employ high pressure differentials across the tube sheet. The apparatus of this invention can be relatively non-complex and readily assembled even by a relatively unskilled fabricator.

An apparatus of this invention comprises an elongated tubular shell having at least one open end; an essentially fluid impermeable end closure cap fastened to and covering the elongated tubular shell at the open end, the end closure cap having at least one fluid communication port; a plurality of tubes which are generally parallel and extend longitudinally to form at least one bundle in the elongated tubular shell; a rigid, essentially fluid impermeable tube sheet in which the tubes of the at least one bundle are embedded in a fluid tight relationship in the tube sheet such that the lumens of the tubes provide fluid communication through the tube sheet wherein:

(1) the tube sheet has an open face, an opposing bundle face from which the at least one bundle extends in the tubular shell, and a lateral surface extending between the faces,
(2) the tube sheet has an expanded zone extending a portion of the lateral surface of the tube sheet, and at least one of the end face and the bundle face has at least one smaller cross-sectional dimension than the corresponding cross-sectional dimension of the expanded zone,
(3) the at least one cross-sectional dimension of the expanded zone is greater than the corresponding cross-sectional dimension of the remainder of the tube sheet, and
(4) the tube sheet has at least one rise region on the lateral surface of the tube sheet, which rise region is intermediate the expanded zone and a smaller face, wherein, over the rise region, at least one cross-sectional dimension of the tube sheet increases;

a rigid tubular spacer substantially surrounding the lateral surface of the tube sheet for at least a portion of the distance between the faces and abutting at least one rise region of the tube sheet, wherein the tubular spacer defines an opening adapted to receive said tube sheet for the at least a portion of the distance between the faces and position the tube sheet within the spacer, said opening having a cross-section which is sufficiently large to provide space between the tubular spacer and the tube sheet to accommodate differentials in expansion between the tubular spacer and the tube sheet; and a sealing means positioned between (a) at least one of the tube sheet and tubular spacer and (b) at least one of the end closure cap and tubular shell such that the lumens of the tubes extending to the end face of the tube sheet are in a fluid tight relationship with respect to the exterior of the tubes extending from the bundle face of the tube sheet.

A tube sheet of the apparatus of this invention has an expanded zone having at least one cross-sectional dimension which is greater than the corresponding cross-sectional dimension throughout the remainder of the tube sheet. A cross-sectional dimension is any dimension between the boundaries of the tube sheet which resides in (i.e., is coplanar with) a plane perpendicular to the axis of the tube sheet (i.e., the axis of the tube sheet is that axis parallel to the longitudinal axis of the elongated tubular shell). A corresponding cross-sectional dimension to a particular cross-sectional dimension is a cross-sectional dimension which is coplanar with a plane parallel with (including coplanar with) the axis of the tube sheet, which plane is coplanar with the particular cross-sectional dimension. The tube sheet also has at least one face, i.e., at least one of the end face and the bundle face, which has at least one smaller cross-sectional dimension than the corresponding cross-sectional dimension of the expanded zone of the tube sheet. For the sake of convenience, the face terminating the lateral surface containing the at least one rise region is referred to as the "smaller face" although the remaining face may be smaller, the same size, or larger than that face. Most frequently, the expanded zone has a greater cross-sectional area than the cross-sectional area throughout the remainder of the tube sheet, and thus the smaller face has a smaller cross-sectional area than the cross-sectional area of the expanded zone. Also, in a preferred aspect of the invention, the cross-sectional dimensions of the tube sheet do not exceed (i.e., are up to) about the corresponding cross-sectional dimensions of the expanded zone. That is, the peripheral boundaries of the expanded zone in this aspect of the invention are not exceeded by the remainder of the tube sheet. The increase in cross-sectional dimensions from the smaller face to the expanded zone may be continuous, e.g., curvilinear, tapered, or the like, or the increase may be stepped up in one or more steps with or without intermediate decreasing steps.

The tube sheet has at least one rise region on the lateral surface of the tube sheet intermediate the smaller face and the expanded zone. The rise region may comprise a portion, or the entire zone of, the increase in cross-sectional dimensions from the smaller face to the expanded zone. At the rise region, the cross-sectional dimensions of the tube sheet increase toward the expanded zone. The rise region preferably extends beyond (i.e., outward from) the zone within the tube sheet through which the bundle of tubes passes. The at least one rise region serves to abut the tubular spacer and thereby blocks relative movement in at least one direction between the tubular spacer and the tube sheet. A rise region may be continuous, i.e., extending completely around the perimeter of the tube sheet, or the rise region may be discontinuous with the peripheral dimensions of the tube sheet increasing at only certain locations around the perimeter of the tube sheet. A rise region may be substantially perpendicular, or it may be inclined, with respect to the axis of the tube sheet. When the rise region is inclined, it is preferred that the angle of inclination with respect to the axis of the tube sheet is at least about 10°. Often, the angle of inclination with respect to the axis of the tube sheet is at least about 15°. When the increase in cross-sectional dimensions between the smaller face and the expanded zone is only over a minor portion of the lateral surface between the smaller face and the expanded zone, the angle of inclination of the rise region is frequently at least about 45° or 60°. These larger angles of inclination are preferred such that slippage between the tubular spacer and tube sheet can readily occur when a differential in expansion exists.

Although both the end face and the bundle face of the tube sheet can be smaller in at least one cross-sectional dimension than the corresponding cross-sectional dimension of the expanded zone, it is only necessary that one of the faces be smaller. Most conveniently, the end face is the smaller face in order to facilitate assembly of the apparatus. Clearly, when the end face is the smaller face, the tubular spacer may be unitary and can be readily placed over the tube sheet. When the smaller face is the bundle face, the tubular spacer should either be segmented to permit its assembly around the tube sheet or be placed on the bundle prior to forming the tube sheet or be capable of being drawn onto the bundle from the other end of the bundle after the fabrication of the tube sheet.

The peripheral dimensions of the smaller face of the tube sheet preferably extend outside the zone of the tube sheet through which the bundle of tubes passes. Most preferably, the peripheral dimensions of the tube sheet extend outside the zone of the tube sheet through which the bundle passes. Most desirably, the peripheral dimensions of the smaller face are only slightly larger than the peripheral dimensions of the bundle within the tube sheet, e.g., the difference between the perimeter of the smaller face and the perimeter of the bundle is often less than 10, and most desirably less than about 5, centimeters.

The expanded zone frequently has at least one cross-sectional dimension which is larger than the corresponding cross-sectional dimension of the smaller face. Frequently the difference in this dimension between the expanded zone and the smaller face is at least about 1 centimeter, say, at least about 2 centimeters, for instance, about 2 to 10 or more centimeters. The distance (in a direction parallel to the axis of the tube sheet) between the smaller face and the expanded zone (hereafter the length of the projection zone) is usually sufficient to enable the tube sheet to be maintained in the tubular spacer such that the desired abutting between the tubular spacer and the tube sheet can be readily accomplished. Moreover, the length of the projection zone can assist in maintaining the tube sheet at a desired location. For instance, the projection zone may be mated with the tubular spacer for positioning of the tube sheet. The length of the projection zone is often at least about 10 percent, say, about 10 or 15 percent to essentially the entire length of the tube sheet. In some instances, the length of the projection zone is at least about 25 percent, and may be at least about 50 or 75 percent of the length of the tube sheet in order to reduce the amount of material of the tube sheet. Most often, the length of the projection is at least about 1, say, at least about 2, for instance, about 2 to 25, centimeters. The axial dimension, i.e., the length in a direction parallel to the axis of the tube sheet, through the tube sheet at the point of intended contact with the tubular spacer (the rise region), is generally sufficient to provide adequate structural strength to the tube sheet to withstand differentials in total pressure which may occur across the tube sheet under operating conditions. Frequently this distance is at least about 1, say, at least about 2, for instance, about 2 to 25, or 2 to 20, centimeters.

One of the advantages of the tube sheets utilized in the apparatus of this invention is that the tube sheet can be of sufficient length in the axial direction to obtain a desired fluid tight relationship between the tubes and the tube sheet, yet the entire length of the tube sheet need not have the larger cross-sectional dimensions required for securing the tube sheet within the apparatus. Accordingly, since less material of the tube sheet need be employed, the amount of swelling or contraction which may be encountered can be minimized in the regions of the tube sheet having the lesser cross-sectional dimensions. Moreover, since these regions of the tube sheet having the lesser cross-sectional dimensions can be fabricated such that the periphery of the region is only slightly larger than the periphery of the zone of the tube sheet through which the bundle passes, differentials in expansion between the portion of the tube sheet containing the tubes and the portion of the tube sheet not containing the tubes can be accommodated.

The tube sheet may have any general configuration suitable for use in apparatus containing bundles of tubes. Since these apparatus must frequently have circular cross-sections, the tube sheet in such instances generally has a circular cross-section.

The tube sheet is rigid, i.e., the tube sheet exhibits sufficient strength that it retains its configuration under stress. Rigid tube sheets are preferred due to the strength and integrity which they can provide. Often, the material of the tube sheet exhibits a Shore A hardness (ASTM D 2240) of at least about 60, most frequently at least about 70 or 75, say, at least about 80 or 90. Suitable materials for forming a tube sheet include settable liquid resins (natural or synthetic), and particularly resinous compositions which cross-link during setting. Frequently the cross-linking (or curing) increases the strength of the tube sheet as well as increases the resistance of the tube sheet to chemicals. Suitable resins for tube sheets often include epoxies, phenolics, acrylics, urea urethanes, and the like.

The tube sheet may be formed in a suitable manner, e.g., by casting a resinous material around the end of the bundle of tubes such as disclosed in U.S. Pat. Nos. 3,339,341 (Maxwell, et al.) and 3,442,389 (McLean) or by impregnating the ends of the tubes with resinous material while assembling the tubes to form a bundle such as disclosed in U.S. Pat. Nos. 3,455,460 (Mahon) and 3,690,465 (McGinnis, et al.) all of which are incorporated by reference. The length (in the axial direction) of the tube sheet is generally sufficient to provide suitable strength for withstanding total pressure differentials to which the tube sheet may be subjected in operations. Thus, the length employed may depend upon the strength of the resin. Also, the tube sheet should be sufficeintly thick that ample contact is provided between the tubes and the resin such that an essentially fluid tight relationship is ensured. Consequently, the adherence between the tubes and the material of the tube sheet will also affect the desired lengths of the tube sheets. Often, tube sheets are at least about 2, e.g., about 2 to 50, say, about 2 to 25 or 30, centimeters in length.

The lumens of the tubes are exposed for fluid communication at the end face of the tube sheet. Any suitable technique may be employed for providing exposed lumens at the end face of the tube sheet. For instance, the lumens of the tubes may be plugged prior to casting the tube sheet, and then after casting the tube sheet, the end of the casting can be severed to form the end face of the tube sheet and expose the lumens of the tubes.

An apparatus of this invention also comprises a tubular spacer which substantially surrounds the lateral surface of the tube sheet for at least a portion of the distance between the faces of the tube sheet, and preferably the tubular spacer extends at least a portion of the distance between the smaller face and the rise region. Conventiently, with the smaller face of the tube sheet as the end face, the tubular spacer extends sufficiently far to contact the end closure cap. The tubular spacer has a bore having a sufficiently large cross-section to provide sufficient space between the tubular spacer and the tube sheet to accommodate differentials in expansion transverse to the axis of the tube sheet. Desirably, the tubular spacer also allows for differentials in expansion in an axial direction. The tubular spacer can advantageously serve to position the tube sheet within the shell. The tubular spacer can also provide support to the tube sheet and, in some instances can assist in effecting a fluid tight relationship across the tube sheet. Furthermore, the tubular spacer can often be more readily machined to close tolerances than can a tube sheet. Accordingly, the tubular spacer can be closely toleranced to fit within the shell, but yet, enable use of tube sheets which are not so closely toleranced and which otherwise may be unaccepatable to provide a fluid tight relationship directly with the shell. Additionally, the tubular spacer may be prepared from the same material as the shell, or alternatively the same material as the tube sheet, to minimize differentials in expansion with either the shell or the tube sheet and thereby facilitate maintaining a fluid tight relationship over widely varying operating conditions.

The tubular spacer has at least one contact zone which abuts at least one rise region of the tube sheet. The contact between the tubular spacer and the rise region may be directed or may be through, e.g., "O" rings, gaskets, washers, or the like. The contact zone may extend continuously around the perimeter of the tube sheet at rise region, or a plurality of contact zones may be provided to abut the tube sheet around its perimeter at a rise region. In any event, sufficient contact zones should be provided on the tubular spacer in order to prevent relative movement between the tubular spacer and the tube sheet along one direction of the axis of the tube sheet (i.e., provide a blocking effect). Since sufficient space should be provided between the tubular spacer and the tube sheet to accommodate differentials in expansion between the tubular spacer and the tube sheet, the contact between the contact zone of the tubular spacer and the rise region of the tube sheet preferably permits relative movement between the tubular spacer and the tube sheet under operating conditions such that differentials in expansion can be tolerated. This contact would therefore be a moveable contact. Thus, if, for example, the rise region is essentially perpendicular to the axis of the tube sheet, a differential in expansion may result in a relative movement at the contact zone between the tube sheet and the tubular spacer in a direction essentially perpendicular to the axis of the tube sheet. On the other hand, if the contact zone is inclined with respect to the axis of the tube sheet, such a differntial in expansion between the tube sheet then the tubular spacer may result in a relative movement between the tubular spacer and tube sheet which has an axial component as well as a component perpendicular parallel to the axis of the tube sheet. Since the contact zone need only be a relatively small portion of the lateral surface area of the tube sheet and the surface area of the tubular spacer in order to provide the desired blocking effect, little friction may exist which would hinder such relative movements to relieve differentials in expansion.

With respect to surfaces of the tube sheet and tubular spacer, which surfaces are not capable of freely moving with respect to each other, in order to dissipate differentials in expansion (e.g., parallel surfaces which are in turn parallel to the axis of the tube sheet), an ample distance should be provided between the tube sheet and tubular spacer that the expected differentials in expansion during operation do not result in contact between the tubular spacer and the tube sheet. Frequently, this distance is less than about 2 centimeters, say, less than about 1 centimeter, e.g., about 0.05 to 0.5 centimeter. Resilient members may be positioned between the tube sheet and the spacer in order to position the tube sheet within the tubular spacer and, if desired, provide a fluid tight seal between the tube sheet and the tubular spacer. Suitable resilient means may include, e.g., gaskets such as "O" rings, elastomeric sealants, and the like.

Preferably, the tubular spacer is adapted to mate with at least the projection zone of the tube sheet, i.e., the bore of the tubular spacer generally follows the contour of at least the projection zone of the tube sheet, such that the tube sheet can be readily placed and maintained in a desired position in the apparatus.

The tubular spacer may be fabricated from any suitable material which exhibits sufficient strength and rigidity to withstand expected operating conditions. Since tubes need not be embedded in the tubular spacer, a wider variety of materials are available for the fabrication of the tubular spacer than are available for the fabrication of the tube sheet. Advantageously, the material of the ube sheet can easily be machined to suitable tolerances. Most preferably, the material of the tubular spacer exhibits little change in dimensions over the expected operating conditions of the apparatus. Most commonly, the material of the tube sheet exhibits greater expansions and contractions than are exhibited by the tubular spacer. Suitable materials for fabricating the tubular spacer may include polymeric materials such as epoxies, phenolic resins, etc.; metals such as aluminum, steel, etc.; and the like.

The drawings are provided to further assist in the understanding of the invention and are not provided as limitations to the invention. While permeators are depicted in the drawings, it is easily recognized that the principles can apply to other apparatus.

Figure 1:
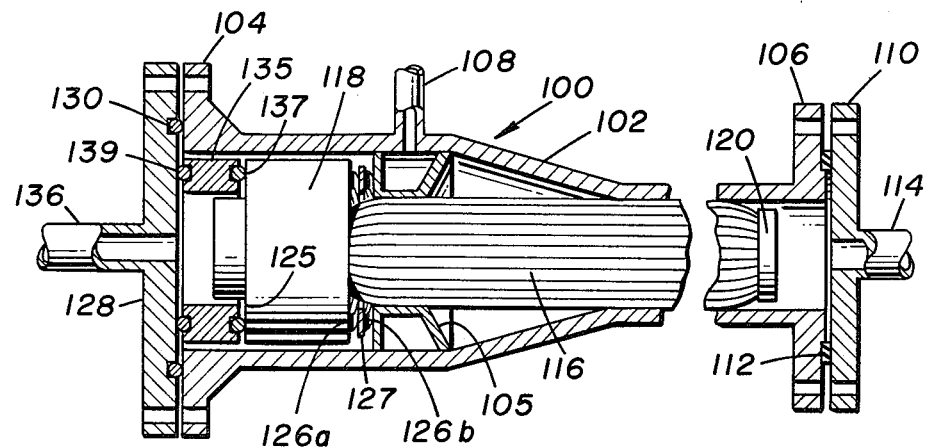
FIG. 1 is a schematic representation of a longitudinal cross-section of a permeator in accordance with this invention having a tubular spacer extending between the end closure cap and the tube sheet.

The permeator depicted in FIG. 1 is generally designated by the numeral 100. Permeator 100 comprises shell 102 (only the head and tail ends are depicted) which is adapted to receive a tube sheet at one end. Shell 102 may be comprised of any suitable, fluid impervious material such as metals and plastics. In many permeators, metals such as steel are employed due to their ease of fabrication, durability, and strength. The shell may be in any suitable cross-sectional configuration; however, generally circular cross-sections are preferred. Shell 102 has a head end of increased diameter. The head end has head end flange 104 and fluid communication port 108. Port 108 can provide for fluid communication with the interior of the shell. While only a single port 108 is depicted, it should be understood that a plurality of ports 108 may be positioned around the periphery of shell 102. End cap 110 is positioned at the tail end of shell 102 and is fastened by bolts (not shown) to tail flange 106. Gasket 112 is positioned between end cap 110 and tail flange 106 to provide an essentially fluid impermeable seal. End cap 110 is provided with port 114 for fluid communication through the end cap.

Within shell 102 is positioned bundle 116 (not shown in cross-section) which is composed of a plurality of hollow fiber membranes. Often the bundle comprises over 10,000 hollow fibers and, with smaller diameter hollow fibers or larger diameter shells, there may be an excess of 100,000 or even an excess of 1 million fibers. As depicted, the bundle has essentially the same cross-sectional configuration as the shell. One end of each of the hollow fibers is embedded in plug 120 (not shown in cross-section). The bores of the hollow fibers do not communicate through plug 120. The other end of bundle 116 passes through plenum 105 having a fluid distribution ports (not shown). Plenum 105 is positioned within the head end of the shell 102 and serves to distribute fluid passing to or from fluid communication port 108. Bundle 116 is terminated at the head end with tube sheet 118 (not shown in cross-section). The bores of the hollow fibers communicate through tube sheet 118 to the open end of shell 102. Wave springs 126a and 126b are separated by washer 127 and serve to provide a force between plenum 105 and tube sheet 118. By utilizing alternating wave springs and washers, a desired spacing and flexibility can be achieved. Accordingly, suitable forces can be obtained without concern for close tolerancing of the length of the tube sheet.

At the rise region 125 of tube sheet 118 is positioned tubular spacer 135. The tubular spacer has "O" ring 137 at its contact region to abut rise region 125 of the tube sheet. "O" ring 139 is positioned at the opposite end of tubular spacer 135. Head end closure cap 128 is adapted to cover the open end of the shell and is securely fastened to shell 102 by the use of bolts (not shown). "O" ring 130 is positioned between the head end closure cap 128 and head end flange 104 such that when head end closure 128 having fluid communication port 136 is securely attached to the shell, a fluid tight relationship is achieved. "O" ring 139 contacts head end closure cap 128 in a fluid tight manner wherein the fluid tight relationship is provided by the forces exerted on tube sheet 118 by wave washers 126a and 126b. These forces also provide a fluid tight seal of "O" ring 137 with rise region 125 of tube sheet 118.

In an operation of permeator 100, a fluid feed mixture may be introduced into the shell side of the permeator through port 114 or, preferably, port 108, with the nonpermeating fluid being removed from the shell side of the permeator through the other port. Permeating fluid enters the bores of the hollow fibers and communicates through the tube sheet 118 and is exhausted from the permeator through port 136 in head end closure cap 128.

Tubular spacer 135 serves to position tube sheet 118 within the shell. The expanded zone of the tube sheet can therefore be maintained a sufficient distance away from the interior surface of shell 102 that any differentials in expansion between the shell and the tube sheet can be accommodated. Tubular spacer 135 surrounds only the smaller diameter portion of tube sheet 118, which portion is only slightly larger than the zone through which the hollow fibers pass. Since this portion of the tube sheet will exhibit less absolute expansion than the expanded zone of the tube sheet, the distance between the tubular spacer and the tube sheet can be less than that required between the shell and the expanded zone of the tube sheet. Hence, the positioning of the tube sheet in the shell is facilitated. The tubular spacer and the shell, if made of materials exhibiting similar differentials in expansion under operating conditions, can be in close proximity. Also, "O" ring 137 enables relative movement between the tube sheet and the tubular spacer in the event of a differential in expansion. Furthermore, since the contact between the tubular spacer and the tube sheet is essentially only at "O" ring 137, the tubular spacer does not restrict expansions or contractions of the tube sheet along its axis.

Figure 2:
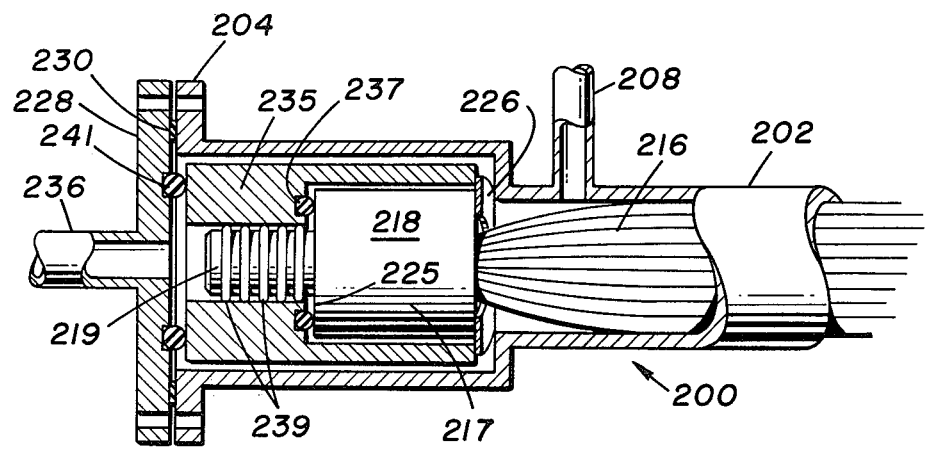
FIG. 2 is a schematic representation of a partial view of the longitudinal cross-section of a permeator in accordance with this invention wherein the tubular spacer surrounds the tube sheet, and the tube sheet is in a fluid tight relationship with the tubular spacer.

FIG. 2 illustrates the head portion of a permeator generally designated by the numeral 200. Permeator 200 comprises shell 202 which has a circular cross-sectional configuration. Shell 202 is provided with head end flange 204 and fluid communication port 208. Within shell 202 is positioned bundle 216 (not shown in cross-section) which is composed of a plurality of hollow fibers. The bundle has the same general transverse cross-sectional configuration as the interior of the shell. Bundle 216 is terminated at the head end with tube sheet 218 (not shown in cross-section). As depicted, tube sheet 218 has a cylindrical expanded zone 217, a perpendicular rise region 225, and a concentric cylindrical portion 219 extending from the expanded zone to the end face. Tubular spacer 235 surrounds the entire length of tube sheet 218 and has (a) a portion with a small bore adapted to receive the concentric cylindrical portion (projection zone) 219 of the tube sheet and (b) a portion with a larger bore adapted to receive the expanded zone 217 of tube sheet. Between the rise region 225 and the contact region of tube spacer 235 is positioned "O" ring 237. A plurality of "O" rings 239 surround concentric cylindrical portion 219 and contact the wall of the smaller bore in tubular spacer 235. "O" rings 239 provide a fluid tight seal between the tube sheet 218 and tubular spacer 235. Since concentric cylindrical portion 219 of the tube sheet has a diameter only slightly larger than the diameter of the bundle passing through the tube sheet, the expansions and contractions of the tube sheet due to the operating environments to which the permeator may be subjected, may not be of sufficient magnitude to hinder achieving fluid tight seal by "O" rings 239. "O" ring 241 is provided at the end of tubular spacer 235 and is adapted to contact end closure cap 228 to provide a fluid tight relationship between the tubular spacer and the end closure cap. Wave spring 226 is provided at the bundle face of tube sheet 218 in order to retain tube sheet 218 within tubular spacer 235 and to force tubular spacer 235 into contact with end closure cap 228. Gasket 230 is positioned between end closure cap 228 and head end flange 204 to provide a fluid tight seal, and end closure cap 228 has port 236 for fluid communication with the bores of the hollow fibers.

In another embodiment, if tubular spacer 235 and shell 202 exhibited substantially the same expansion and contraction characteristics in the environments to which the permeator would be subjected, "O" ring 241 could alternatively surround tubular spacer 235 and contact interior surface of shell 202 to achieve the desired fluid tight relationship.

Figure 3:
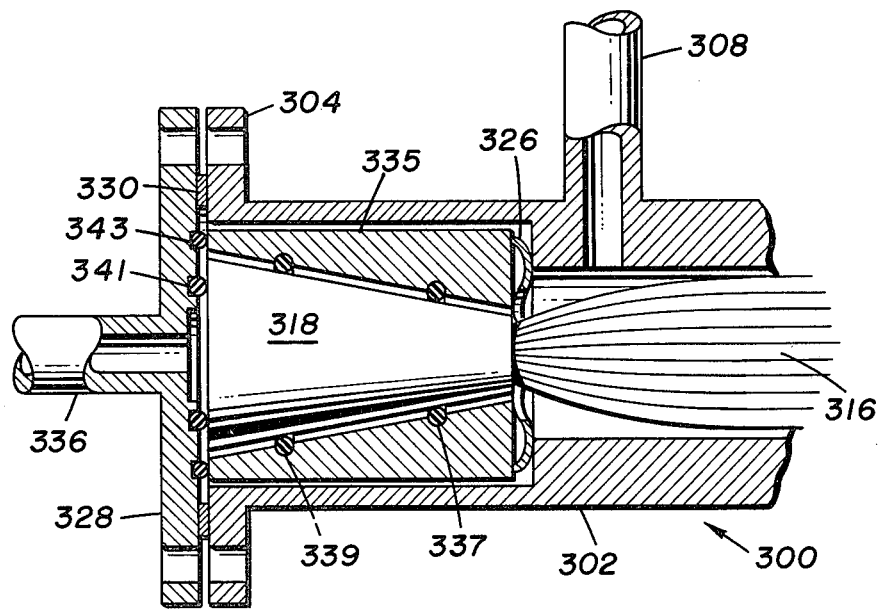
FIG. 3 is a schematic representation of a partial view of the longitudinal cross-section of a permeator in accordance with this invention wherein the tube sheet has the configuration of a truncated cone with the largest end of the cone being the end face of the tube sheet.

FIG. 3 illustrates the head portion of a permeator generally designated by the numeral 300. Permeator 300 comprises shell 302 which has a circular transverse cross-sectional configuration. Shell 302 is provided with head end flange 304 and fluid communication port 308. Within shell 302 is positioned bundle 316 (not shown in cross-section) which is composed of a plurality of hollow fibers. The bundle has the same general transverse cross-sectional configuration as the shell. Bundle 316 is terminated at the head end with tube sheet 318 (not shown in cross-section) which is in the configuration of a truncated cone with the broader base of the truncated cone being the end face. The broader base of the tube sheet is the expanded zone. Tubular spacer 335 surrounds tube sheet 318 and has a tapered inner surface adapted to receive the tube sheet. Resilient "O" rings 337 and 339 are positioned between tube sheet 318 and tubular spacer 335 in order to position tube sheet 318 in tubular spacer 335 and a gap exists between the tube sheet and the tubular spacer to accommodate differentials in expansion. "O" rings 337 and 339 may also assist in providing a fluid tight relationship between the tube sheet and the tubular spacer. "O" ring 341 is positioned between the end face of tube sheet 318 and head end closure cap 328 for providing a fluid tight relationship, and "O" ring 343 is positioned between head end closure cap 328 and tubular spacer 335 and may provide a fluid tight seal. Wave washer 326 is positioned at the other end of tubular spacer 335 to provide a force for maintaining both the tube sheet and the tubular spacer in contact with "O" rings 341 and 343, respectively, and ensure the abutting between the rise region of the tube sheet and "O" rings 337 and 339 of tubular spacer 335. Gasket 330 is provided between head end closure cap 328 and head end flange 304 to provide a fluid tight seal. Head end closure cap is also provided with port 336 for fluid communication with the bores of the hollow fibers.

Differentials in expansion between the tube sheet and the tubular spacer can be accommodated by the gap between them and the resiliency of "O" rings 337 and 339. Also, relative movement between the tube sheet and tubular spacer may occur in a direction substantially parallel to the axis of the tube sheet (particularly when the tube sheet contacts more than the tubular spacer) in order to maintain a suitable contact with, e.g., "O" rings 337 and 339 to provide a fluid tight seal. Furthermore, differentials in expansion which are parallel to the axis of the tube sheet can be accommodated.

In another embodiment, the gap between tube sheet 318 and tubular spacer 335 may be filled with an elastomeric material which provides suitable sealing and also flows sufficiently that undue stresses are not developed due to differentials in expansion between the tube sheet and the tubular spacer.

Figure 4:
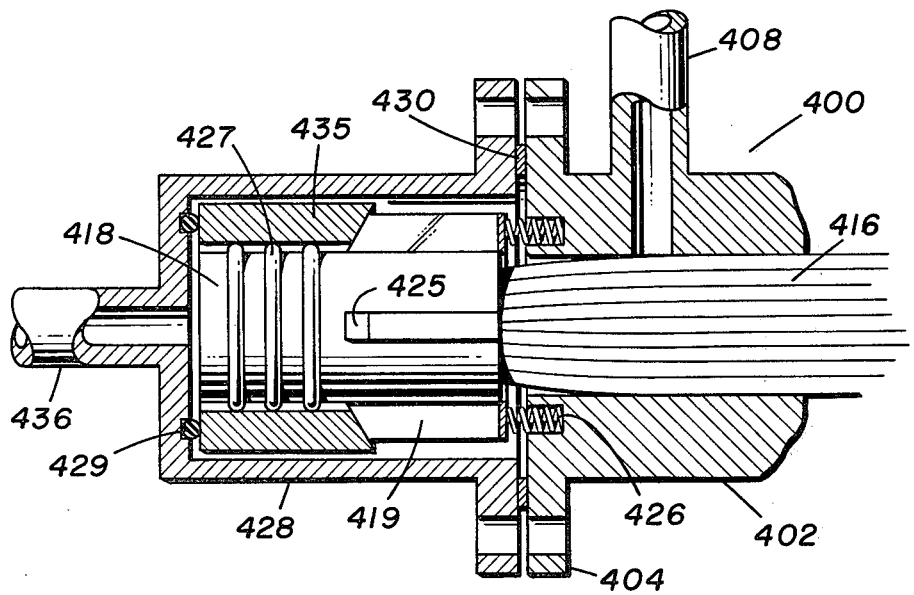
FIG. 4 is a schematic representation of a partial view of a longitudinal cross-section of a permeator in accordance with this invention wherein the tube sheet has lateral projections which contact the tubular spacer.

FIG. 4 illustrates the head portion of the permeator generally designated by the numeral 400. Permeator 400 comprises shell 402 which has a circular cross-sectional configuration. Shell 402 is provided with head end closure flange 404 and fluid communication port 408. Head end closure cap 428 is adapted to close the open end of shell 402 and is secured to head end flange 404 by bolts (not shown). Gasket 430 is positioned between head end closure cap 428 and shell 404 to provide a fluid tight seal. Within shell 402 is positioned bundle 416 (not shown in cross-section) which is composed of a plurality of hollow fibers. The bundle has the same general transverse cross-sectional configuration of the interior of the shell. Bundle 416 is terminated at the head end with tube sheet 418 (not shown in cross-section). As depicted, tube sheet 418 is cylindrical with the diameter only slightly larger than the diameter of the bundle passing therethrough and has a plurality of projections 419 forming the expanded zone. The expanded zone extends from a mid-portion of the tube sheet to the bundle face of the tube sheet and each projection 419 provides a rise region 425. A tubular spacer 435 extends from the rise region of tube sheet 418 to the end face of the tube sheet. A plurality of coil springs 426 are positioned within the end of shell 402 and exert forces on projections 419 of tube sheet 418. The forces serve to ensure contact of each of the rise regions 425 of tube sheet 418 with the contact region of tubular spacer 435. The other end of tubular spacer 435 contacts "O" ring 429 positioned between head end closure cap 428 and the tubular spacer. Resilient "O" rings 427 surround the tube sheet and contact the interior surface of tubular spacer 435 in order to provide a fluid tight seal. "O" rings 427 exhibit sufficient resiliency to absorb any differentials in expansions or contractions which may occur under the operating conditions to which the permeator may be subjected and also provide a gap between the tube sheet and the tubular spacer to accommodate differentials in expansion. Head end closure cap 428 is provided with conduit 436 for fluid communication with the bores of the hollow fibers.

In the embodiment depicted in FIG. 4, the tube sheet is positioned outside the shell. Clearly, in the apparatus of this invention, the tube sheet may extend at least partially into the shell, or, if desired, it may residue outside the shell at the open end. When the tube sheet is intended to at least partially be placed inside the shell and that portion is not surrounded by a tubular spacer, it is preferred that the cross-sectional dimensions of the tube sheet be sufficiently less than the cross-sectional dimensions of the shell that the tube sheet can be slideably positioned within the shell.

Since essentially the entire tube sheet has only a slightly larger diameter than the bundle of hollow fibers passing through the tube sheet, the magnitude of expansions or contractions of the tube sheet is minimized. Since the projections 419 are of small volume, the effect of differentials in expansion between the projection and the remainder of the tube sheet, can be tolerated.

This invention is particularly useful for providing permeators. The permeators may be any suitable design for effecting fluid separations and may be single ended or double ended permeators. A single ended permeator 20 has a tube sheet at only one end (such as depicted in FIG. 1), and one or both ends of the tubes (generally referred to as hollow fibers in the permeator art) are embedded in the tube sheet. When only one end of each of the hollow fibers is embedded in the tube sheet, the other end must be plugged or otherwise closed. In a double ended permeator, a tube sheet is provided at each end of the shell and the hollow fibers may extend from one tube sheet to the other tube sheet, or the permeators may contain at least two distinct bundles of hollow fibers where at least one bundle extends into only one tube sheet.

The permeator may be operated in any desired manner, e.g., the fluid feed mixture may be introduced into the shell and initially contact the shell side of the hollow fibers, or it may be introduced into the bores of the hollow fibers. The flow pattern of the fluid on the shell side of the hollow fibers may be primarily transverse to the longitudinal orientation of the hollow fibers or may be primarily axial to the orientation of the hollow fibers. When the flow on the shell side of the hollow fibers is axial, it may be generally concurrent or countercurrent with the flow in the bores of the hollow fibers.

Hollow fiber membranes may be fabricated from any suitable synthetic or natural material suitable for fluid separation or for the support of materials which effect the fluid separations. The selection of the material for the hollow fiber may be based on heat resistance, chemical resistance, and/or mechanical strength of the hollow fiber as well as other factors dictated by the intended fluid separation for which it will be used and the operating conditions to which it will be subjected. The material for forming the hollow fibers may be inorganic, organic or mixed inorganic and organic. Typical inorganic materials include glasses, ceramics, cermets, metals and the like. The organic materials are usually polymers.

The cross-sectional dimensions of the tubes utilized in an apparatus of this invention may be selected over a wide range; however, the tube should have sufficient wall thickness to provide adequate strength, and the bore (lumen) should be sufficiently large as to not result in an unduly high pressure drop to fluids passing in the bore. Frequently, the tubes exhibit some flexibility over their lengths to accommodate any expansions or contractions which may occur under expected operating conditions. Particularly with hollow fiber membranes, the outside diameter of the hollow fiber is at least about 20, say, at least about 30 microns, and the same or different outside diameter fibers may be contained in a bundle. Often the outside diameter of hollow fiber membranes does not exceed about 800 or 1000 microns since such larger diameter hollow fibers may provide less desirable ratios of hollow fiber surface area per unit volume of the permeator. However, with apparatus other than permeators, larger diameter tubes, e.g., up to 2 or more centimeters in diameter, may be particularly desirable. Preferably, the outside diameter of hollow fiber membranes is about 50 to 800 microns. Generally, the wall thickness of the hollow fibers is at least about 5 microns, and in some hollow fibers, the wall thicknesses may be up to about 200 or 300 microns, say, about 50 to 200 microns. With hollow fibers fabricated from materials having lesser strength, it may be necessary to employ larger hollow fiber diameters and wall thicknesses to impart sufficient strength to the hollow fiber. The walls of the hollow fibers may be essentially solid or may contain a substantial void volume. When voids are desired, the density of the hollow fiber can be essentially the same throughout its wall thickness, i.e., the hollow fiber is isotropic, or the hollow fiber can be characterized by having at least one relatively dense region within its wall thickness in barrier flow relationship in the wall of the hollow fiber, i.e., the hollow fiber is anisotropic.

Generally, shells for permeators have a circular cross-sectional configuration due to availability, handling convenience, and strength; however, shells of other cross-sectional configurations, e.g., rectangular, may be highly suitable for many permeators. Often, the shells have a major cross-sectional dimension of at least about 0.02, or preferably at least about 0.05 meter, say, up to about 1 or 2 or more meters. The length of the shell containing the hollow fibers is frequently at least about 0.2 or 0.3, say, at least about 0.5, meter, up to 10 or more meters. For apparatus other than permeators, shell diameters of over 1 meter may be useful and the length of the shell may be about 0.5 to 10 meters.

The hollow fibers are generally parallelly arranged in the form of one or more bundles in the shell. Generally, at least about 10,000 and often substantially greater numbers, e.g., up to 1 million or more hollow fibers are contained in a permeator. The fibers in the bundle, for instance, may be relatively straight, or they may be spirally wound such as disclosed by McLain in U.S. Pat. No. 3,422,008. In many instances, a single bundle of hollow fibers is employed in a permeator and at least one end of the hollow fibers in the bundle is embedded in a tube sheet. The opposite end of the hollow fibers may be looped back, i.e., the bundle is generally in a "U" shape, and embedded in the same tube sheet, or the opposite end of the hollow fibers may be plugged or embedded in another tube sheet. When the hollow fibers in the bundle are in a "U" shape, the ends may be segmented such that different regions on the tube sheet contain each end of the hollow fibers. Each of these regions on a tube sheet can be maintained in an essentially fluid impermeable relationship such that the fluid communication between the regions can only occur by passage of fluid through the bores of the hollow fibers.

In apparatus other than permeators such as heat exchangers, double ended apparatus (i.e., having a tube sheet at each end of the bundle) are most commonly found. Since larger tubes may be employed such that undue pressure drops do not occur to fluids passing through the bores of tubes, often less tubes are contained in an apparatus. Frequently, these apparatus may contain about 500 to 50,000 tubes.

It is claimed:

1. An apparatus comprising
   (a) an elongated tubular shell having at least one open end;
   (b) an essentially fluid impermeable end closure cap fastened to and covering said elongated tubular shell at the open end, said end closure cap having at least one fluid communication port;
   (c) a plurality of tubes which are generally parallel and extended longitudinally to form at least one bundle in the elongated tubular shell;
   (d) a rigid, essentially fluid impermeable tube sheet in which the tubes of said at least one bundle are embedded in a fluid tight relationship in the tube sheet such that the lumens of the tubes provide fluid communication through the tube sheet wherein:
      (i) the tube sheet has an end face, an opposing bundle face from which said at least one bundle extends in to the tubular shell, and a lateral surface extending between said faces,
      (ii) the tube sheet has an expanded zone which expanded zone extends a portion of the lateral surface of the tube sheet, and at least one of said end face and said bundle face has at least one smaller cross-sectional dimension than the corresponding cross-sectional dimension of said expanded zone,
      (iii) the at least one cross-sectional dimension of the expanded zone is greater than the corresponding cross-sectional dimension of the remainder of the tube sheet, and
      (iv) the tube sheet has at least one rise region on the lateral surface of the tube sheet, which rise region is intermediate the expanded zone and a smaller face, wherein, over the rise region, at least one cross-sectional dimension of the tube sheet increases;
   (e) a rigid tubular spacer substantially surrounding the lateral surface of the tube sheet for at least a portion of the distance between the faces and abutting at least one rise region of the tube sheet, wherein said tubular spacer defines an opening adapted to receive said tube sheet for said at least a portion of the distance between the faces and position the tube sheet within the spacer, said opening having a cross-section which is sufficiently large to provide space between the tubular spacer and the tube sheet to accommodate differentials in expansion between the tubular spacer and the tube sheet; and
   (f) a sealing means positioned between (i) at least one of the tube sheet and tubular spacer and (ii) at least one of the end closure cap and tubular shell, such that the lumens of the tubes extending to the end face of the tube sheet are in a fluid tight relationship with respect to the exterior of the tubes extending from the bundle face of the tube sheet.

2. The apparatus of claim 1 in which the material of the tube sheet exhibits a Shore A hardness of at least about 70.

3. The apparatus of claim 1 in which the tube sheet is in a fluid tight relationship with the tubular spacer.

4. The apparatus of claim 3 in which a resilient member is positioned between the tube sheet and the tubular spacer to provide said fluid tight relationship.

5. The apparatus of claim 1 in which the peripheral dimensions of the smaller face of the tube sheet are only slightly larger than the peripheral dimensions of the bundle within the tube sheet.

6. The apparatus of claim 5 in which the difference between the perimeter of the smaller face and the perimeter of the bundle is less than about 5 centimeters.

7. The apparatus of claim 1, 3 or 6 in which the expanded zone has at least one cross-sectional dimension which is at least 1 centimeter larger than the corresponding cross-sectional dimension of the smaller face.

8. The apparatus of claim 1 in which the rise region is continuous around the periphery of the tube sheet.

9. The apparatus of claim 8 in which the rise region is substantially perpendicular to the axis of the tube sheet.

10. The apparatus of claim 8 in which the rise region is inclined with respect to the axis of the tube sheet.

11. The apparatus of claim 10 in which the rise region extends from one face to the other face of the tube sheet.

12. The apparatus of claim 11 in which the bundle face is the smaller face.

13. The apparatus of claim 1 in which the rise region is discontinuous around the periphery of the tube sheet.

14. The apparatus of claim 1 in which the tubular spacer extends from the at least one rise region toward the smaller face.

15. The apparatus of claim 14 in which the tubular spacer extends to the end closure cap.

16. The apparatus of claim 15 in which the tubular spacer and the end closure cap are in a fluid tight relationship.

17. The apparatus of claim 1, 8, 9, 10, or 16 in which the rise region of the tube sheet is in moveable contact with the tubular spacer.

18. The apparatus of claim 1, 4, 8, 9, 10, or 14 in which the material of the tube sheet exhibits greater expansions and contractions than are exhibited by the tubular spacer.

19. The apparatus of claim 1 in which the tubular spacer is unitary.

20. The apparatus of claim 1 which is a permeator and the tubes are hollow fiber membranes.

21. The apparatus of claim 1, 4, 8, 14, 15, or 20 in which the smaller face has a smaller cross-sectional area than the cross-sectional area of the expanded zone.

22. The apparatus of claim 1, 4, 8, 14, 15, or 20 in which the cross-sectional dimensions of the tube sheet are up to the corresponding cross-sectional dimensions of the expanded zone.

* * * * *